United States Patent
McNeill, Jr.

(10) Patent No.: US 7,519,773 B2
(45) Date of Patent: *Apr. 14, 2009

(54) ON-DEMAND CACHE MEMORY FOR STORAGE SUBSYSTEMS

(75) Inventor: Andrew B. McNeill, Jr., Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/944,202

(22) Filed: Nov. 21, 2007

(65) Prior Publication Data

US 2008/0071989 A1 Mar. 20, 2008

Related U.S. Application Data

(63) Continuation of application No. 10/965,134, filed on Oct. 14, 2004, now Pat. No. 7,328,309.

(51) Int. Cl.
*G06F 12/00* (2006.01)

(52) U.S. Cl. .................. 711/118; 711/113; 711/154; 711/170

(58) Field of Classification Search ................ 711/118, 711/113, 154, 170
See application file for complete search history.

(56) References Cited

U.S. PATENT DOCUMENTS

| | | | | |
|---|---|---|---|---|
| 5,136,692 A | * | 8/1992 | Barrett et al. | 710/5 |
| 5,367,656 A | * | 11/1994 | Ryan | 711/213 |
| 5,465,342 A | * | 11/1995 | Walsh | 711/119 |
| 5,499,354 A | * | 3/1996 | Aschoff et al. | 711/129 |
| 5,519,846 A | * | 5/1996 | Swenson | 711/130 |
| 5,537,635 A | * | 7/1996 | Douglas | 711/129 |
| 5,732,240 A | * | 3/1998 | Caccavale | 711/118 |
| 5,752,255 A | * | 5/1998 | Jarvis | 711/3 |
| 6,047,356 A | * | 4/2000 | Anderson et al. | 711/129 |
| 6,324,631 B1 | * | 11/2001 | Kuiper | 711/170 |
| 7,328,309 B2 | * | 2/2008 | McNeill, Jr. | 711/118 |
| 2007/0174552 A1 | * | 7/2007 | McNeill, Jr. | 711/118 |

FOREIGN PATENT DOCUMENTS

EP 0391871 A2 * 10/1990

\* cited by examiner

*Primary Examiner*—Stephen C Elmore
(74) *Attorney, Agent, or Firm*—Kunzler & McKenzie

(57) ABSTRACT

A cache on-demand module employing a cache performance module for managing size adjustments to a cache size of a cache memory in view of supporting an optimal performance of a storage subsystem employing the cache memory by determining an optimal cache size of the cache memory for supporting the optimal performance of the storage subsystem, and reporting any size adjustment to the cache size of the cache memory based on the determined optimal cache size of the cache memory. The cache on-demand module further employs a cache accounting module for managing a client expense account associated with the cache memory by determining whether a client charge or a client rebate is warranted as a function of any size adjustment to the cache size of the cache memory by the cache performance module.

9 Claims, 9 Drawing Sheets

ON-DEMAND CACHE MEMORY FOR STORAGE SUBSYSTEMS

RELATED APPLICATIONS

This application claims the benefit of, and priority to application Ser. No. 10/965,134, now U.S. Pat. No. 7,328,309 filed Oct. 14, 2005 as a continuation application and is related to application Ser. No. 11/696,025 filed Apr. 3, 2007.

FIELD OF INVENTION

The present invention generally relates to cache memory of a storage subsystem. The present invention specifically relates to optimizing a cache size of the cache memory and monitoring each adjustment in the cache size of the cache memory in view of optimizing the cache size of the cache memory.

BACKGROUND OF THE INVENTION

Storage subsystems as known in the art can support a variable size of cache memory that must be determined prior to an initial purchase of the cache memory by a client. However, determining the optimal size of the cache memory to configure within a storage subsystem in not a straightforward process due to the fact the optimal size of the cache memory is a function of many variables, such as, for example, the number of servers operatively associated with the storage subsystem, the types of applications that will be sharing the storage subsystem, and the various sizes of the working sets of data associated with the storage subsystem. As such, very few clients, if any, will be able to specify the optimal size of the cache memory with any certainty when initially purchasing the cache memory. Consequently, a significant number of storage subsystems will either have more cache memory than required whereby money is wasted on the additional cache memory, or have less cache memory than required whereby the performance of the storage subsystem will not be optimal. The computer industry is therefore continually striving to assist a client in achieving optimal performance of a storage subsystem at the lowest possible cost.

SUMMARY OF THE INVENTION

The present invention provides a new and unique cache on-demand module employing a cache performance module and a cache accounting module. The cache performance module manages size adjustments to a cache size of a cache memory in view of supporting an optimal performance of a storage subsystem employing the cache memory. The cache accounting module manages a client expense account associated with the cache memory based on any size adjustments to the cache size of the cache memory by the cache performance module.

One form of the present invention is a signal bearing medium tangibly embodying a program of machine-readable instructions executable by one or more processors to perform operations for managing size adjustments to a cache size of a cache memory in view of supporting an optimal performance of a storage subsystem employing the cache memory. The operations involve a determination of an optimal cache size of the cache memory for supporting the optimal performance of the storage subsystem, and a reporting of any size adjustment to a cache size of the cache memory based on the determined optimal cache size of the cache memory to thereby facilitate a management of a client expense account associated with the cache memory.

A second form of the present invention is a computer employing one or more processors and a memory storing instructions operable with the processor(s) to perform operations for managing adjustments to a cache size of a cache memory in view of supporting an optimal performance of a storage subsystem employing the cache memory. The operations involve a determination of an optimal cache size of the cache memory for supporting the optimal performance of the storage subsystem, and a reporting of any size adjustment to a cache size of the cache memory based on the determined optimal cache size of the cache memory to thereby facilitate a management of a client expense account associated with the cache memory.

The forgoing forms and other forms, features and advantages as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DESCRIPTION OF THE PRESENT INVENTION

Figure 1:
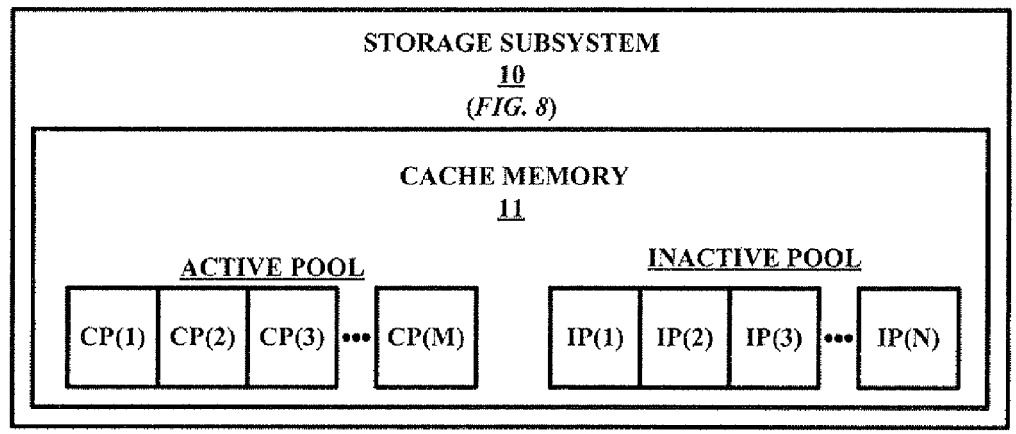
FIG. 1 illustrates one embodiment of a cache memory and a cache on-demand module in accordance with the present invention.
Figure 1:
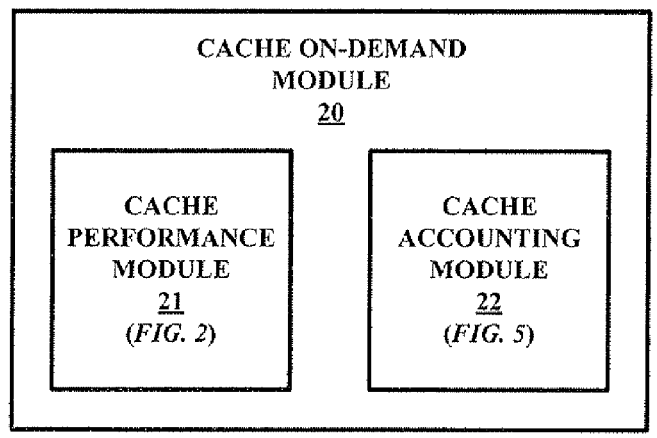

FIG. 1 illustrates cache memory 11 employed by a storage subsystem 10. As illustrated, cache memory 11 has a cache pool consisting of an initial M number of cache pages CP, where M≧1. Cache memory 11 also has an incache pool consisting of an initial N number of incache pages IP, wherein N≧1. Cache memory 11 is intended to be purchased by a client with a view to specify M as close to an optimal cache size for cache memory 11 as possible with N being specified to allow for a maximum size of M+N of cache memory 11 as needed at a reasonable client expense. To this end, a cache on-demand module 20 employs a cache performance module 21 configured with hardware, software, firmware or any combination thereof for managing size adjustments to a cache size of cache memory 11 in view of supporting an optimal performance of storage subsystem 10. Cache on-demand module 20 further employs a cache accounting module 22 configured with hardware, software, firmware or any combination thereof for managing a client expense account associated with cache memory 11 based on any size adjustments to a cache size of cache memory 11 by cache performance module 21.

Figure 2:
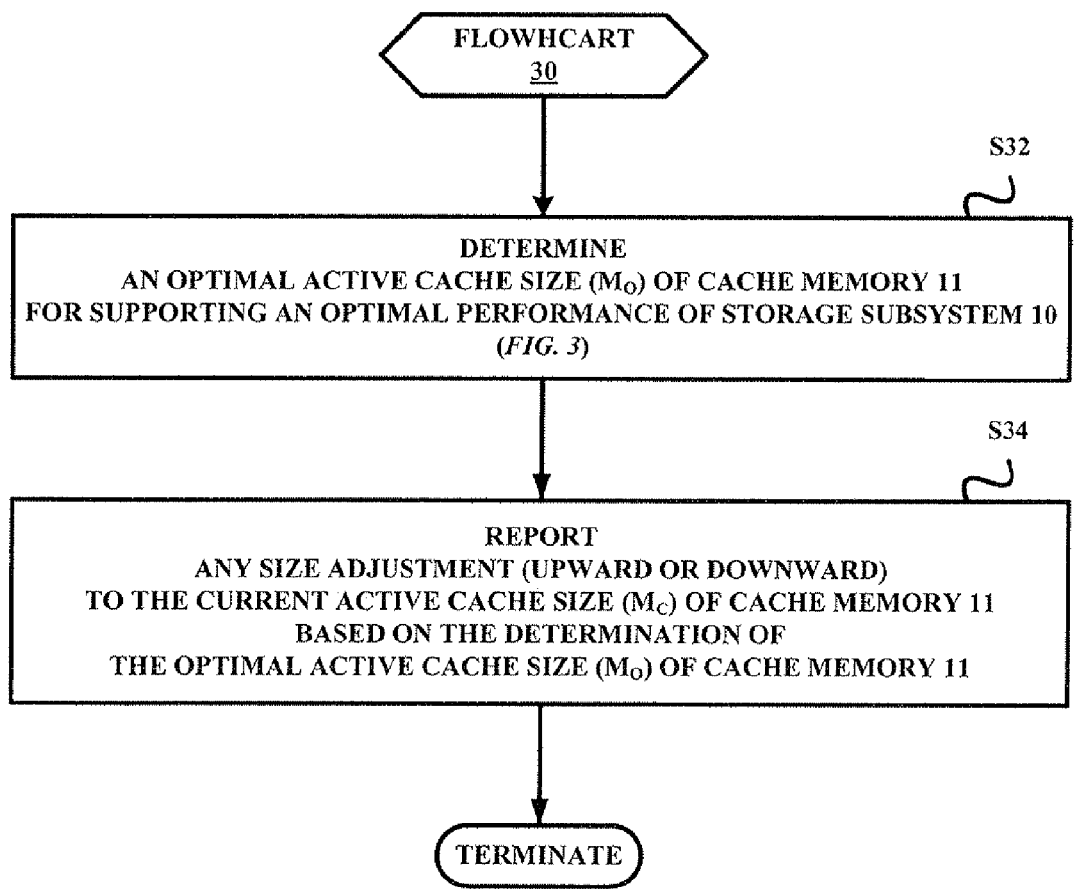
FIG. 2 illustrates a flowchart representative of one embodiment of a cache performance management method in accordance with the present invention.

FIG. 2 illustrates a flowchart 30 representative of a cache performance management method implemented by cache performance module 21 (FIG. 1). A stage S32 of flowchart 30 involves a determination of an optimal cache size $M_O$ of cache memory 11 for supporting an optimal performance of storage subsystem 10. Those having ordinary skill in the art will appreciate the fact that a variety of techniques can be implemented during stage S32 of flowchart 30. Thus, in practice, the techniques available to module 21 for determining of an optimal cache size $M_O$ of cache memory 11 for supporting an optimal performance of storage subsystem 10 are without limit, and are therefore not a limitation as to the scope of stage S32.

Figure 3:
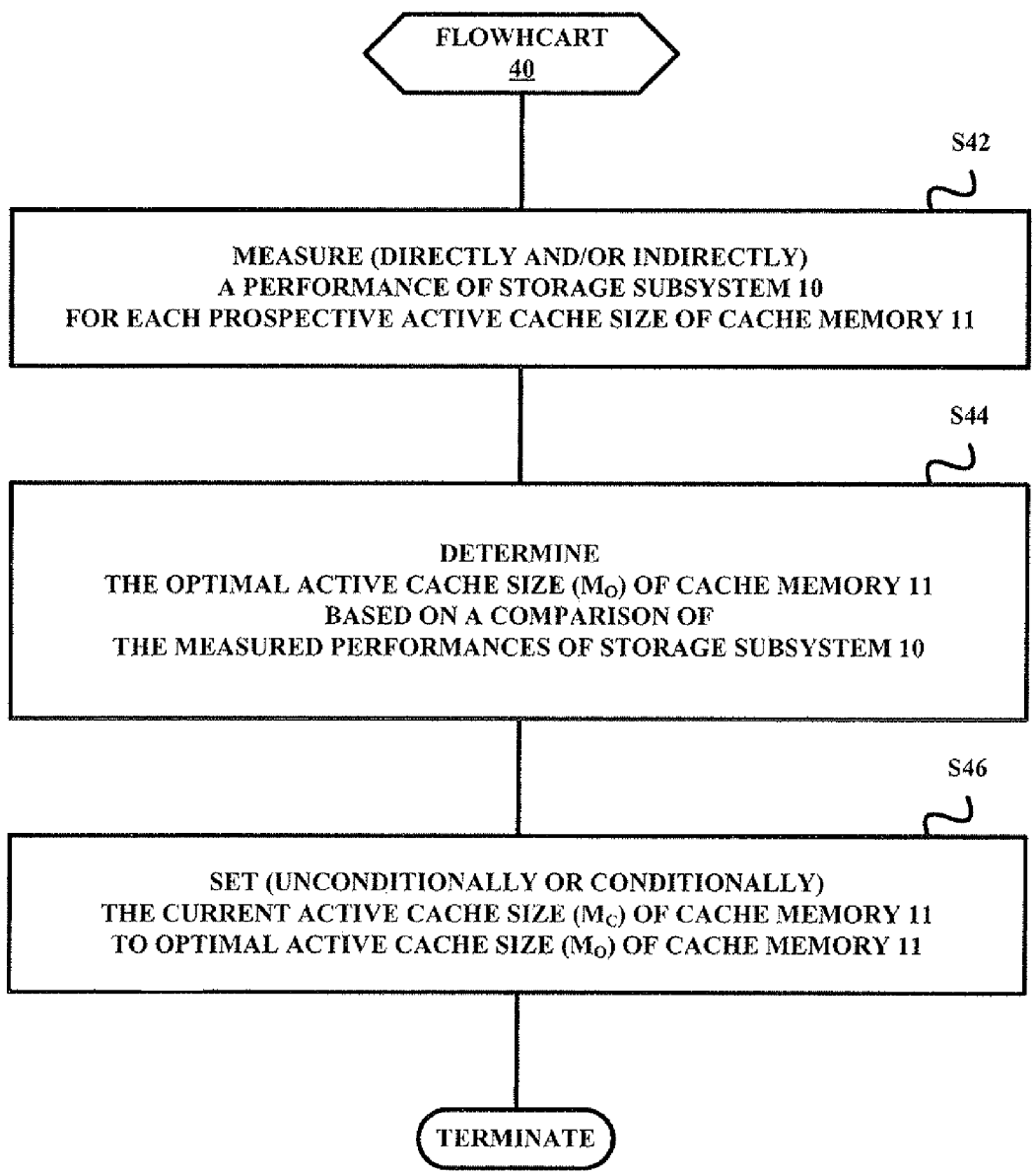
FIG. 3 illustrates a flowchart representative of one embodiment of an optimal cache size determination method in accordance with the present invention.

FIG. 3 illustrates a flowchart 40 representative of one embodiment of stage S32 for determining of an optimal cache size $M_O$ of cache memory 11 for supporting an optimal performance of storage subsystem 10. A stage S42 of flowchart 40 involves an act of measuring, directly or indirectly, by module 21 of a performance of storage subsystem 10 for each prospective cache size of cache memory 11, where a total number P of prospective cache sizes of cache memory 11 is equal to or less than the total number of cache sizes M of cache memory 11. In practice, the total number P of prospective cache sizes can be fixed or variable as a function of the commercial implementation of the present invention, and is therefore not a limitation as to the scope of stage S42.

Those having ordinary skill in the art will appreciate the fact that one or more variables can be taken into account when measuring, directly or indirectly, the performance of storage subsystem 10. Examples of directly measuring the performance of storage subsystem 10 include, but are not limited to, continually discretely or measuring inputs/outputs ("I/O") per second of cache memory 11, and continually or discretely measuring Mbytes per second of cache memory 11. An example of indirectly measuring the performance of storage subsystem 10 includes, but is not limited to, continually or discretely measuring a cache hit ratio of cache memory 11. Thus, in practice, the techniques available to module 21 for measuring the performance of storage subsystem 10 are without limit, and are therefore not a limitation as to the scope of stage S42.

Figure 4:
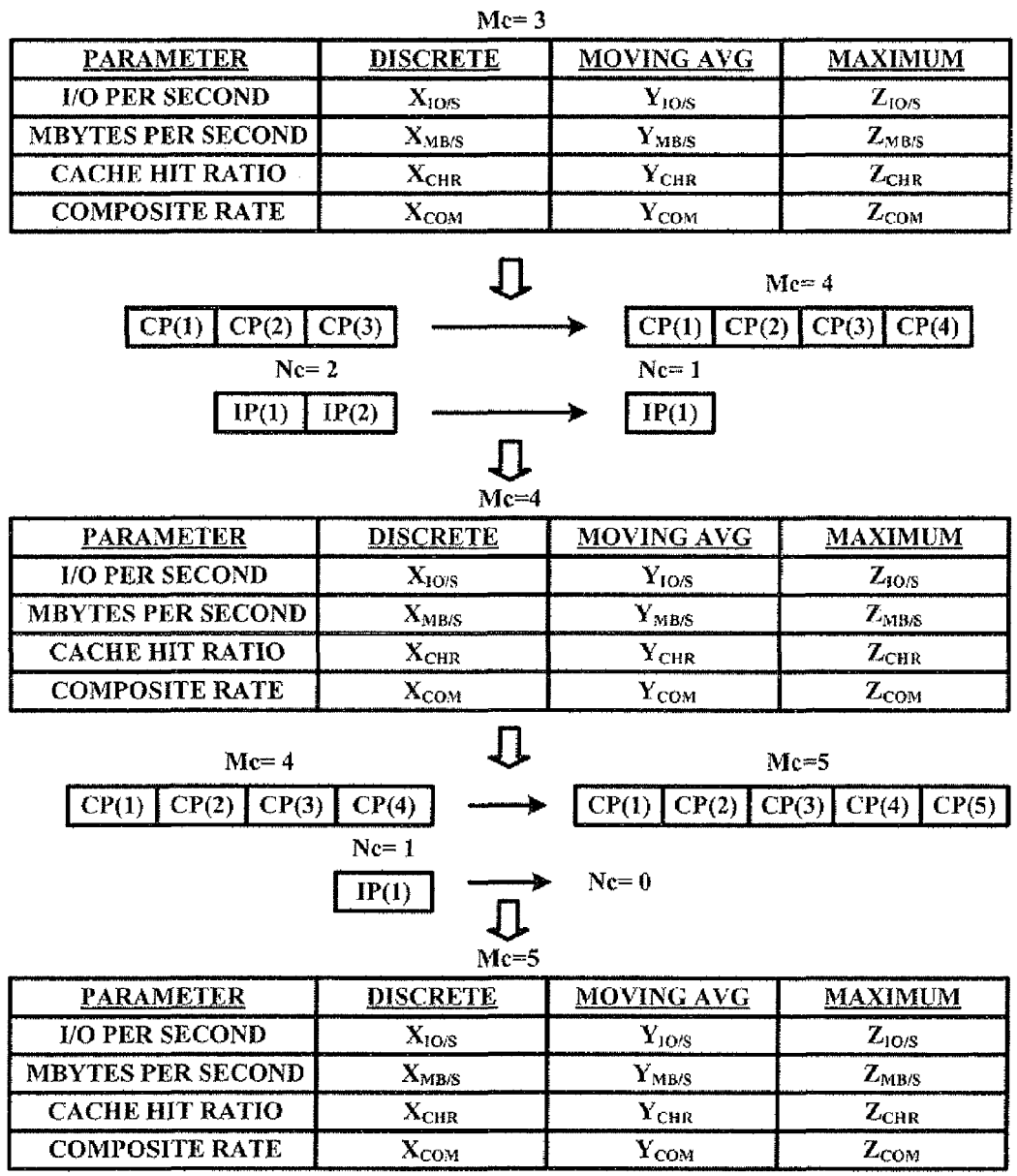
FIG. 4 illustrates an exemplary execution of the flowchart illustrated in FIG. 3.

In one embodiment of stage S42, as exemplary illustrated in FIG. 4, module 21 maintains a table listing of a discrete magnitude $X_{IO/S}$ of I/Os per second of cache memory 11, a moving average $Y_{IO/S}$ of I/Os per second of cache memory 11, and/or a maximum magnitude $Z_{IO/S}$ of I/Os per second of cache memory 11 for three (3) prospective cache sizes of cache memory 11.

In a second embodiment of stage S42, as exemplary illustrated in FIG. 4, module 21 maintains a table listing of a discrete magnitude $X_{MB/S}$ of MBytes per second of cache memory 11, a moving average $Y_{MB/S}$ of MBytes per second of cache memory 11, and/or a maximum magnitude $Z_{MB/S}$ of MBytes per second of cache memory 11 for three (3) prospective cache sizes $M_C$ of cache memory 11.

In a third embodiment of stage S42, as exemplary illustrated in FIG. 4, module 21 maintains a table listing of a discrete magnitude $X_{CHR}$ of a cache hit ratio of cache memory 11, a moving average $Y_{CHR}$ of the cache hit ratio of cache memory 11, and/or a maximum magnitude $Z_{CHR}$ of the cache hit ratio of cache memory 11 for three (3) prospective cache sizes of cache memory 11.

In a fourth embodiment of stage S42, as illustrated in FIG. 4, module 21 maintains a composite table listing of I/Os per second, Mbytes per second and cache hit ratio(s) of cache memory 11 for three (3) prospective cache sizes of cache memory 11.

Irrespective of which of the aforementioned embodiments is implemented by module 21 during stage S42, a measurement of each cache size takes place over a predefined time interval. In one embodiment, the predefined time interval is fixed. In a second embodiment, the predefined time interval is a function of one or more operational aspects of storage subsystem 10 (FIG. 1), such as, for example, the predefined time interval extends over a specified number of processed storage commands (e.g., reads and/or writes) of storage subsystem 10.

A stage S44 of flowchart 40 involves a determination by module 21 of the optimal cache size $M_O$ of cache memory 11 based on a comparison of the measured performances of storage subsystem 10 during stage S42. Those having ordinary skill in the art will appreciate the fact that a variety of techniques can be implemented during stage S44 in comparing the measured performances of storage subsystem 10 during stage S42. Thus, in practice, the techniques available to module 21 for comparing the measured performances of storage subsystem 10 during stage S42 are without limit, and are therefore not a limitation as to the scope of stage S44.

In one embodiment of stage S44, module 21 determines the optimal cache size $M_O$ of cache memory 11 based on which prospective cache size has the highest measured median discrete magnitude $X_{IO/S}$ of I/Os per second, the highest measured moving average $Y_{IO/S}$ of I/Os per second, the highest measured maximum magnitude $Z_{IO/S}$ of I/Os per second, and/or any compilation thereof.

In a second embodiment of stage S44, module 21 determines the optimal cache size $M_O$ of cache memory 11 based on which prospective cache size has the highest measured median discrete magnitude $X_{MB/S}$ of MBytes per second, the highest measured moving average $Y_{MB/S}$ of MBytes per second, the highest measured maximum magnitude $Z_{MB/S}$ of MBytes per second, and/or any compilation thereof.

In a third embodiment of stage S44, module 21 determines the optimal cache size $M_O$ of cache memory 11 based on which prospective cache size has the highest measured median discrete magnitude $X_{CHR}$ of a cache hit ratio, the highest measured moving average $Y_{CHR}$ of a cache hit ratio, the highest measured maximum magnitude $Z_{CHR}$ of a cache hit ratio, and/or any compilation thereof.

In a fourth embodiment of stage S44, module 21 determines the optimal cache size $M_O$ of cache memory 11 based on which prospective cache size has the highest measured median discrete magnitude $X_{COM}$ of a composite rate, the highest measured moving average $Y_{COM}$ of a composite rate, the highest measured maximum magnitude $Z_{COM}$ of a composite rate, and/or any compilation thereof.

In a fifth embodiment of stage S44, module 21 determines the optimal cache size $M_O$ of cache memory 11 based a combination of one or more of the aforementioned embodiments.

Those having ordinary skill in the art will appreciate the fact that, in practice, the actual optimal performance of storage subsystem 10 (FIG. 1) is a function of many variables, such as, for example, the number of servers operatively associated with storage subsystem 10, the types of applications that will be sharing storage subsystem 10, and the various sizes of the working sets of data associated with storage subsystem 10. As such, the optimal cache size $M_O$ of cache memory 11 determined during stage S44 facilitates an attempt to attain and maintain a optimal performance of storage subsystem 10 that is essentially impossible to definitively define. Thus, a stage S46 of flowchart 40 involves a setting, unconditional or conditional, by module 21 of the current cache size $M_C$ of cache memory 11 to the optical cache size $M_O$ of cache memory 11 determined during stage S44 in a view of striving to approach the optimal performance of storage subsystem 10.

As related to an unconditional setting of the current active cache size $M_C$ of cache memory 11 to the optical active cache size $M_O$ of cache memory 11 determined during stage S44, it is assumed that the determined optimal active cache size $M_O$ of cache memory 11 is representative a practical realization of an optimal performance of storage subsystem 10. During stage S44, an unconditional setting of the current active cache size $M_C$ of cache memory 11 to the optimal active cache size $M_O$ of cache memory 11 yields a size adjustment to the current active cache size $M_C$ of cache memory 11 only if $M_C \neq M_O$ upon completion of stage S44.

As related to a conditional setting of the current active cache size $M_C$ of cache memory 11 to the optimal active cache size $M_O$ of cache memory 11 determined during stage S44, it is understood that a practical realization of an optimal performance of storage subsystem 10 is secondary as compared to other operational factors, such as, for example, a cost-benefit ratio of adjusting the current active cache size $M_c$ of cache memory 11 to equal the optical active cache size $M_O$ of cache memory 11. In one embodiment, the current active cache size $M_C$ of cache memory 11 is set to optimal active cache size $M_O$ of cache memory 11 upon complying with a performance parameter associated with a client expense account. One example of such a performance parameter is the optimal active cache size $M_O$ of cache memory 11 must increase the performance of storage subsystem 10 be a specified amount in order to justify an adjustment to the current active cache size $M_C$ of cache memory 11.

Irrespective of whether an unconditional setting technique or a conditional setting technique is implemented during stage S46, setting of the current active cache size $M_C$ of cache memory 11 to the optimal active cache size $M_O$ of cache memory 11 yields a size adjustment to the current active cache size $M_C$ of cache memory 11 only if $M_C \neq M_O$ upon completion of stage S44. If a size adjustment to current active cache size $M_C$ of cache memory 11 occurs during stage S46, then module 21 proceeds to a stage S34 of flowchart 32 to report the size adjustment to current active cache size $M_C$ of cache memory 11 to facilitate a management of a client expense account associated with cache memory 11. Those having ordinary skill in the art will appreciate the fact that storage subsystem 10 can be incorporated within a variety of computing and storing systems (e.g., the computing and storing system illustrated in FIG. 8), and therefore module 21 can report a size adjustment to the active cache size $M_C$ of cache memory 11 to a variety of nodes within the system. An example of such nodes, includes, but is not limited to, a storage controller, a host computer, a system administrator computer, an email server, a printer, and/or a fax machine. In one embodiment, module 21 reports a size adjustment to the active cache size $M_C$ of cache memory 11 to module 22, which may be installed at one or more of the nodes of the computing and storing system.

Referring to FIG. 2, module 21 can implement flowchart 30 on a continual basis, on a periodic basis, or on a random basis as desired.

Figure 5:
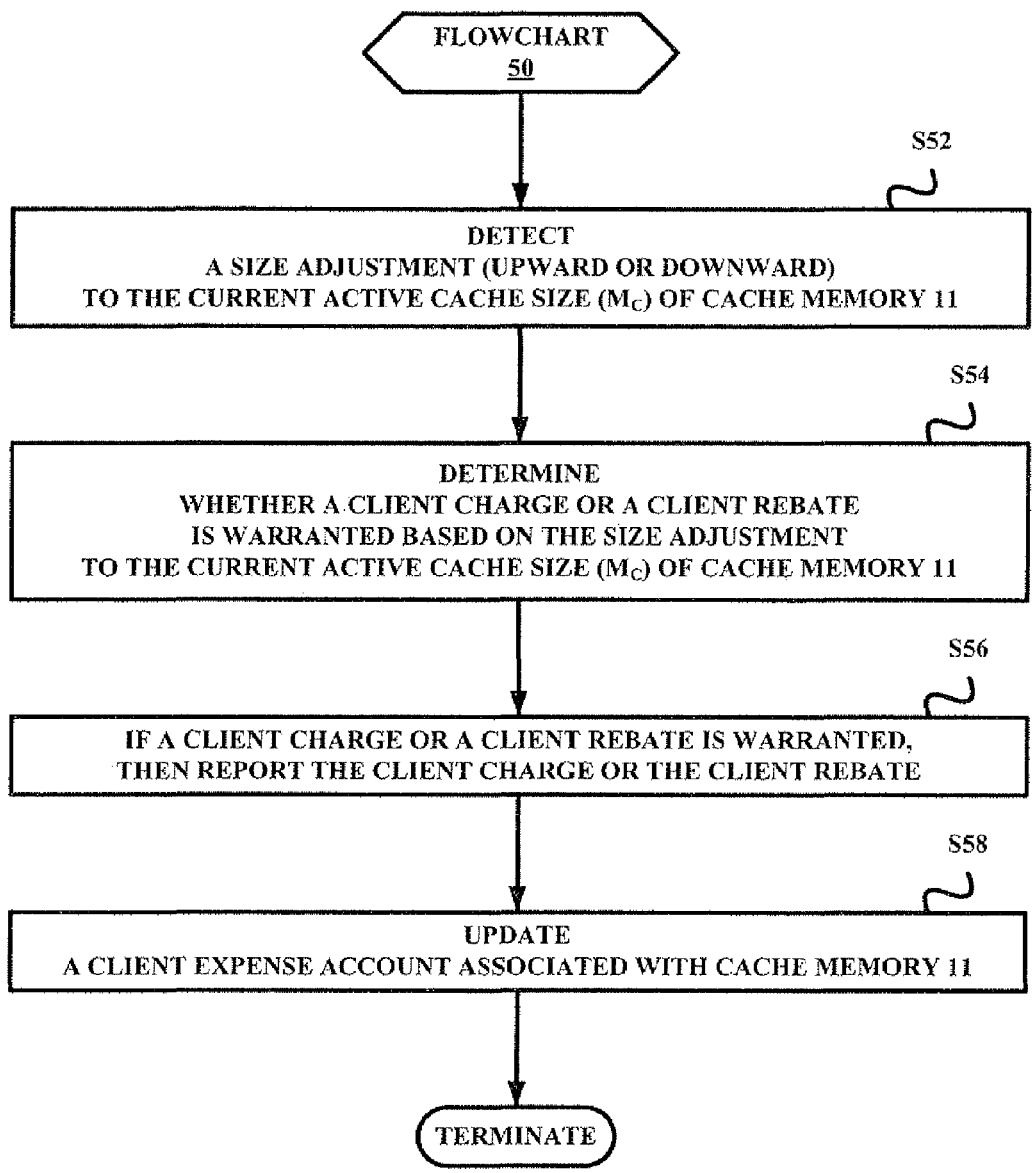
FIG. 5 illustrates a flowchart representative of one embodiment of a cache accounting management method in accordance with the present invention.

FIG. 5 illustrates a flowchart 50 representative of a cache accounting management method implemented by cache accounting module 22 (FIG. 1). A stage S52 of flowchart 50 involves a detection by module 22 of a size adjustment in the cache size $M_C$ of cache memory 11 by module 21. Those having ordinary skill in the art will appreciate the fact that detection in the size adjustment in the cache size M of cache memory 11 by module 31 can be a function of many variables, such as, for example, a date/time stamp, the degree of increment or decrement of the size adjustments in the cache size M of cache memory 11, an accumulation (positive or negative) of size adjustments in the cache size M of cache memory 11, an increase or decrease in the performance of storage subsystem 11 for a size adjustment in the cache size M of cache memory 11, and an accumulation (positive or negative) in the performance of storage subsystem 10 due to all of the changes in the cache size M of the cache memory. Thus, in practice, the techniques available to module 22 for detecting a change in the cache size M of cache memory 11 by module 21 are without limit, and are therefore not a limitation as to the scope of stage S52.

In one embodiment of stage S52, as exemplary illustrated in FIG. 5, module 22 maintains a table listing of each size adjustment in the cache size M of cache memory 11 by module 21. Entry 1 has a date/time $stamp_1$, an increase of +1 cache page for a size accumulation of +1 cache page, and a performance increase of 1% with a performance accumulation of 1%. Entry 2 has a date/time $stamp_2$, an increase of +1 cache page for a size accumulation of +2 cache pages, and a performance increase of 2% with a performance accumulation of 3%. Entry 3 has a date/time $stamp_3$, an increase of +1 cache page for a size accumulation of +3 cache pages, and a performance increase of 4% with a performance accumulation of 7%.

A stage S44 of flowchart 40 involves a determination by module 22 as to whether a client charge or a client rebate is warranted. Those having ordinary skill in the art will appreciate the fact that a client charge or a client rebate can be warranted as a function of one or more thresholds, such as, for example, thresholds associated with an incident-by-incident basis and thresholds associated with an interim basis. Thus, in practice, the techniques available to module 22 for facilitating the client charge/client rebate determination by module 22 are without limit, and are therefore not a limitation as to the scope of stage S44.

Figure 6:
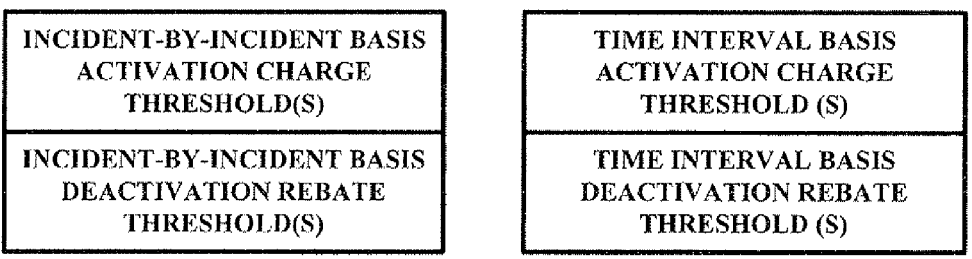
FIG. 6 illustrates an exemplary execution of the flowchart illustrated in FIG. 5.

In one embodiment, as exemplary illustrated in FIG. 6, module 22 implements incident-by-incident basis activation charge threshold(s) and incident-by-incident basis deactivation rebate threshold(s) in determining whether a client charge is warranted.

Examples of incident-by-incident basis activation charge thresholds include, but are not limited to, (1) a client charge is warranted for each +1 cache page increase of the cache size M of cache memory 11, (2) a client charge is warranted for each +1 cache page increase of the cache size M of cache memory 11 upon reaching a size accumulation of +5 cache pages, (3) a client charge is warranted for each +1 cache page increase of the cache size M of cache memory 11 having at least a +1% increase in the performance of storage subsystem 10, and (4) a client charge is warranted for each +1 cache page increase of the cache size M of cache memory 11 upon reaching a performance accumulation of +5% of cache memory 11.

Examples of incident-by-incident basis deactivation rebate thresholds include, but are not limited to, (1) a client rebate is warranted for each −1 cache page decrease of the cache size M of cache memory 11, (2) a client rebate is warranted for each −1 cache page decrease of the cache size M of cache memory 11 upon reaching a size accumulation of −5 cache pages, and (3) a client rebate is warranted for each −1 cache page decrease of the cache size M of cache memory 11 having at least a −1% decrease in the performance of storage subsystem 10, and (4) a client charge is warranted for each −1 cache page decrease of the cache size M of cache memory 11 upon reaching a performance accumulation of 5% of cache memory 11.

In a second embodiment, as exemplary illustrated in FIG. 6, module 22 implements interim basis activation charge threshold(s) and interim basis deactivation rebate threshold(s) in determining whether a client charge is warranted.

Examples of interim basis activation charge thresholds include, but are not limited to, (1) a client charge is warranted for at least a +1 cache page increase of the cache size M of cache memory 11 over a predefined interim time period, (2) a client charge is warranted for at least one +1 cache page increase of the cache size M of cache memory 11 above a size accumulation of +5 cache pages over a predefined interim time period, and (3) a client charge is warranted for at least a +1 cache page increase of the cache size M of cache memory 11 upon reaching a +5% increase in the performance of storage subsystem 10 over a predefined interim time period.

Examples of interim basis deactivation rebate thresholds include, but are not limited to, (1) a client rebate is warranted for at least a −1 cache page decrease of the cache size M of cache memory 11 over a predefined interim time period, (2) a client rebate is warranted for at least a −1 cache page decrease of the cache size M of cache memory 11 upon reaching a size accumulation of −5 cache pages over a predefined interim time period, and (3) a client rebate is warranted for at least a −1 cache page decrease of the cache size M of cache memory 11 upon reaching a −5% decrease in the performance of storage subsystem 10 over a predefined interim time period.

Modules 21 sequentially proceeds to a stage S56 and a stage S58 of flowchart 50 upon completing stage S54.

Stage S56 involves a reporting of a client charge or a client rebate as determine during stage S54. Those having ordinary skill in the art will appreciate the fact that storage subsystem 10 can be incorporated within a variety of computing and storing systems (e.g., the computing and storing system illustrated in FIG. 8), and therefore module 22 can report a client charge or a client rebate to a variety of nodes within the system. An example of such nodes, includes, but is not limited to, a storage controller, a host computer, a system administrator computer, an email server, a printer, and/or a fax machine.

Stage S58 involves an update of a client account associated with cache memory 11 based on the client charge or the client rebate determined in stage S54. Those having ordinary skill in the art will appreciate the fact that a form of a client account can vary from client to client. Thus, in practice, the techniques available to module 22 for updating a client account during stage S58 are without limit, and are therefore not a limitation as to the scope of stage S58.

In one embodiment of stage S58, as exemplary illustrated in FIG. 6, module 22 maintains a table listing of a client account involving a data/time stamp, a current/cumulative charge, and a current/cumulative rebate. The example is given under an incident-by-incident basis activation charge threshold whereby a client charge is warranted for each +1 cache page increase of the cache size M of cache memory 11 upon reaching a performance accumulation of +5% of cache memory 11. Entry 1 has a date/time stamp$_1$, a current/cumulative charge of $0/$0, and a current/cumulative rebate of $0/$0 in view of the fact the first entry is associated with a +1% performance accumulation of cache memory 11. Entry 2 has a date/time stamp$_2$, a current/cumulative charge of $0/$0, and a current/cumulative rebate of $0/$0 in view of the fact the second entry is associated with a +3% performance accumulation of cache memory 11. Entry 3 has a date/time stamp$_3$, a current/cumulative charge of $C/$C for +3 cache pages, and a current/cumulative rebate of $0/$0 in view of the fact the third entry is associated with a +7% performance accumulation of cache memory 11.

Figure 7:
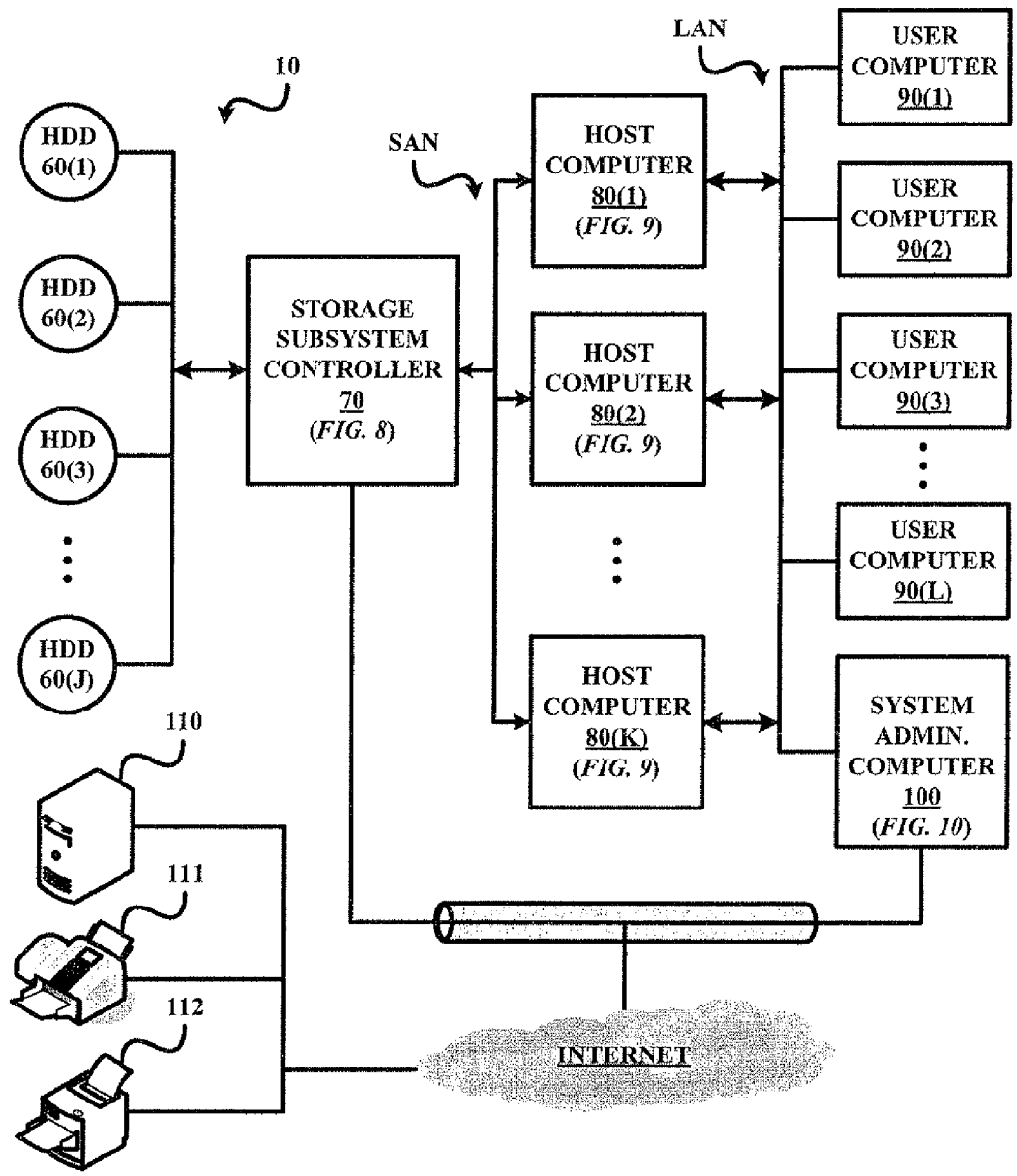
FIG. 7 illustrates one embodiment of a computing and storing system in accordance with the present invention.

FIG. 7 illustrates a computing and storage system including a storage area network ("SAN") that connects J number of hard disk drives ("HDD") 60, where J≧1, and a storing subsystem controller 70 of storage subsystem 10 to K number of host computers 80, where K≧1. The computer and storing system further includes a local area network ("LAN") that connects host computers 80 to L number of user computers 90, where L≧1, and to system administrator computer 100. The computing and storing system further includes an Ethernet and Internet for connecting storage controller 70 to system administrator 100, an email server 110, a printer 111, and a fax 112.

Figure 8:
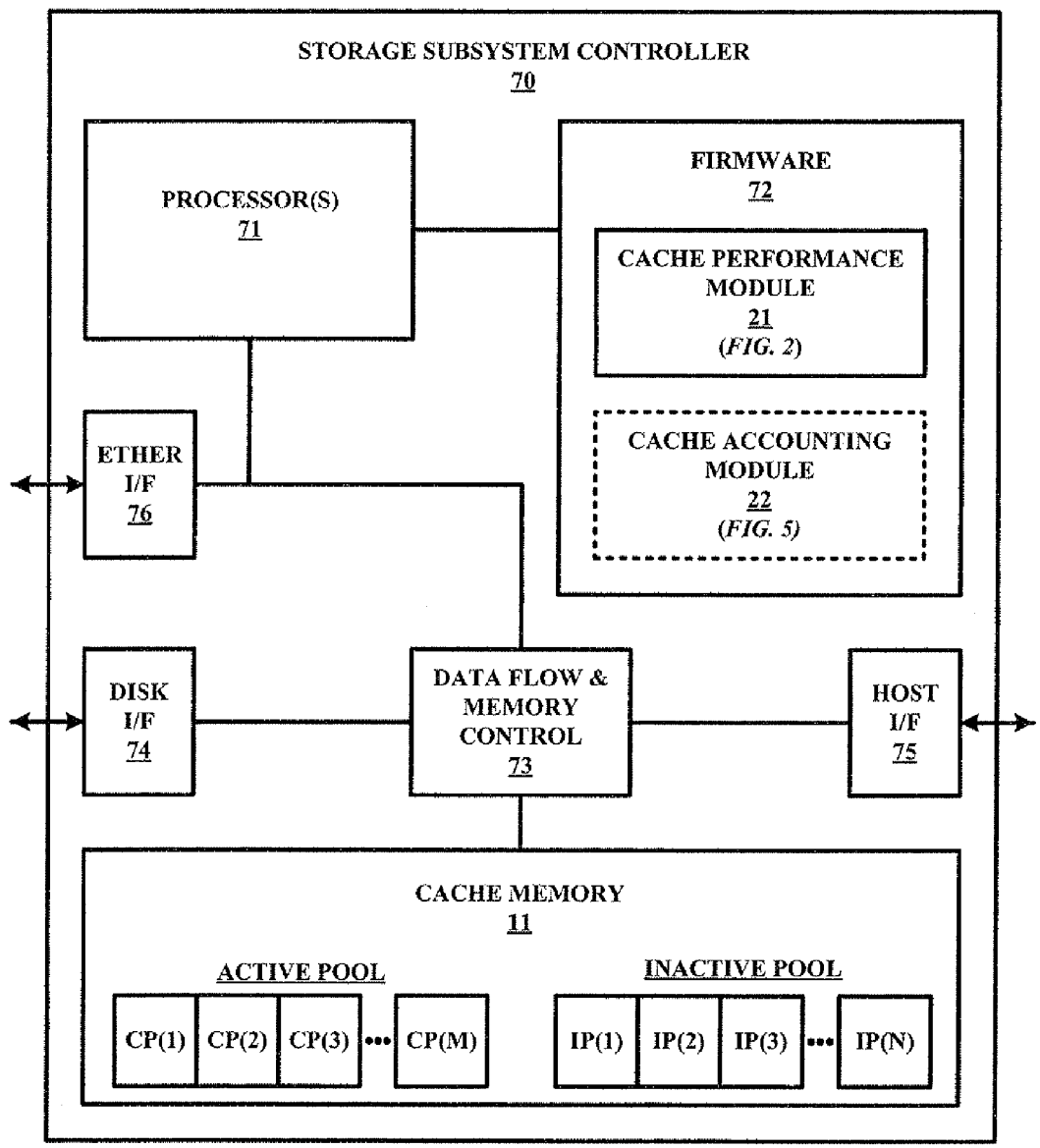
FIG. 8 illustrates one embodiment of a storage subsystem controller in accordance with the present invention.
Figure 9:
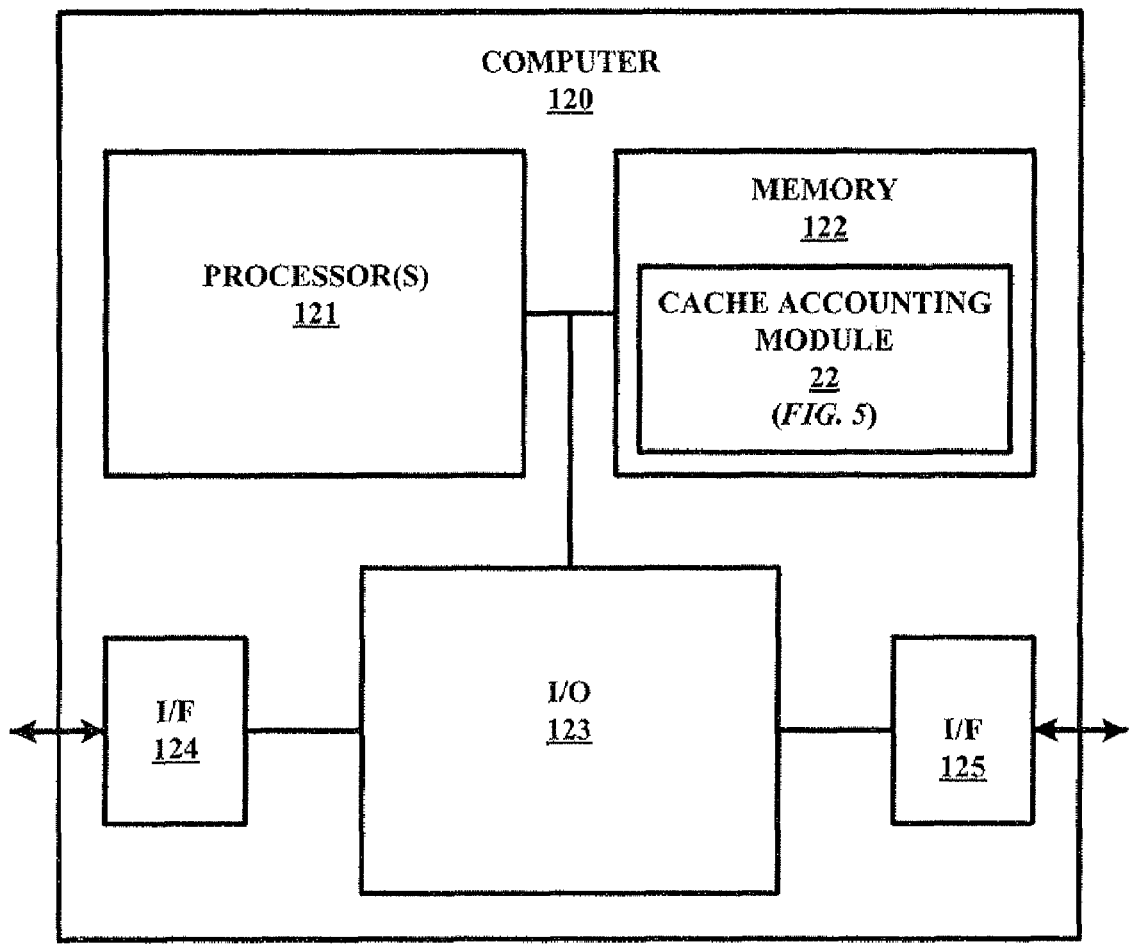
FIG. 9 illustrates one embodiment of a computer system in accordance with the present invention.

In one embodiment, module 21 (FIG. 1) is installed as firmware in controller 70 as illustrated in FIG. 8 and module 22 (FIG. 1) is installed as software in host computer(s) 80, an embodiment of which is illustrated in FIG. 9. Alternatively, module 22 can be installed as firmware in controller 80 as illustrated in FIG. 8 or installed as software in system administrator computer 100, an embodiment of which is illustrated in FIG. 9. Irrespective of where modules 21 and 22 are installed in the computing and storing system of FIG. 7, those having ordinary skill in the art will appreciate the numerous advantages provided by modules 21 and 22 to the computing and storing system of FIG. 7 and alternative versions thereof.

FIG. 8 illustrates controller 70 employing one or more processors 71, firmware 72, data flow & memory control 73, a disk interface 74, a host interface 75, ether interface 76, and cache memory 11. Module 21 of firmware 72 has computer instructions in accordance with flowchart 30 (FIG. 2) or an alternative version thereof. As such, processor(s) 71 can be operated to execute a conventional operating system to (1) control program execution of the computer instructions of module 21, (2) direct control 73 in interfacing with cache memory 11, with hard disk drives 60 via disk interface 74 and with host computer(s) 80 via host interface 75, and (3) interface with the Ethernet and Internet via Ethernet interface 76. Alternatively, module 22 is installed as part of firmware 72 whereby module 22 has computer instructions in accordance with flowchart 50 (FIG. 5) or an alternative version thereof. As such, processor(s) 71 can be operated to execute the conventional operating system to control program execution of the computer instructions of modules 21 and 22.

FIG. 9 illustrates a computer 120 that can serve as an embodiment of host computers 80, system administrator computer 100 and server 110. Computer 120 employs one or more processors 121, and a memory 122 storing computer instructions of module 22 in accordance with flowchart 50 (FIG. 5) or an alternative version thereof. As such, processor(s) 121 can be operated to execute a conventional operating system to control program execution of the computer instructions of module 22 as well as interfacing with other devices via I/O 123 and interfaces 124 and 125.

Referring to FIGS. 7 and 8, the components of controller 80 and computer 120 required to implement modules 21 and 22 are shown. Those having ordinary skill in the art will appreciate other well known components that may be employed by controller 80 and computer 120 in operating the computing and storing system of FIG. 7 and alternative versions thereof.

While the embodiments of the present invention disclosed herein are presently considered to be preferred embodiments, various changes and modifications can be made without departing from the spirit and scope of the present invention.

The scope of the invention is indicated in the appended claims, and all changes that come within the meaning and range of equivalents are intended to be embraced therein.

I claim:

1. A computer, comprising: at least one processor; and a memory coupled to the at least one processor, wherein the memory stores instructions operable with the at least one processor to perform operations for managing changes to a cache size of a cache memory in view of attaining an optimal cache size of the cache memory, the operations including:
   determining an optimal cache size of the cache memory for supporting the optimal performance of a storage subsystem; and
   reporting any size adjustment to the cache size of the cache memory based on the determination of the optimal cache size of the cache memory to thereby facilitate a management of a client expense account associated with the cache memory.

2. The computer of claim 1, wherein determining the optimal cache size of the cache memory for supporting the optimal performance of the storage subsystem includes: measuring a performance of the storage subsystem for each prospective cache size of the cache memory.

3. The computer of claim 2, wherein determining the optimal cache size of the cache memory for supporting the optimal performance of the storage subsystem further includes: determining the optimal cache size of the cache memory based on a comparison of the measured performances of the storage subsystem for the prospective cache sizes of the cache memory.

4. The computer of claim 2, wherein measuring the performance of the storage subsystem for each prospective cache size of the cache memory includes: measuring at least one of an I/O operation rate, a data throughput rate, and a cache hit ratio for each prospective cache size of the cache memory.

5. The computer of claim 4, wherein determining the optimal cache size of the cache memory for supporting the optimal performance of the storage subsystem further includes: comparing at least one of I/O operation rates, data throughput rates, and cache hit ratios for the prospective cache sizes of the cache memory.

6. The computer of claim 2, wherein measuring the performance of the storage subsystem for each prospective cache size of the cache memory further includes: generating a composite performance rate for each prospective cache size of the cache memory, wherein each composite performance rate is a function of at least one of the I/O operation rate measurement, the data throughput rate measurement, and the cache hit ratio measurement of the corresponding prospective cache size of the cache memory.

7. The computer of claim 6, wherein determining the optimal cache size of the cache memory for supporting the optimal performance of the storage subsystem further includes: comparing composite performance rates for the prospective cache sizes of the cache memory.

8. The computer of claim 2, wherein determining the optimal cache size of the cache memory for supporting the optimal performance of the storage subsystem includes: setting the cache size of the cache memory to the determined optimal cache size of the cache memory in response to the measured performance of the determined optimal cache size complying with a performance parameter associated with the client expense account.

9. The computer of claim 1, wherein reporting the size adjustment to the cache size of the cache memory based on the determination of the optimal cache size of the cache memory to thereby facilitate a management of the client expense account associated with the cache memory includes: communicating any size adjustment to the cache size of the cache memory based on the determination of the optimal cache size of the cache memory to at least one device over at least one communication channel established by at least one network.

* * * * *